Figure 1:
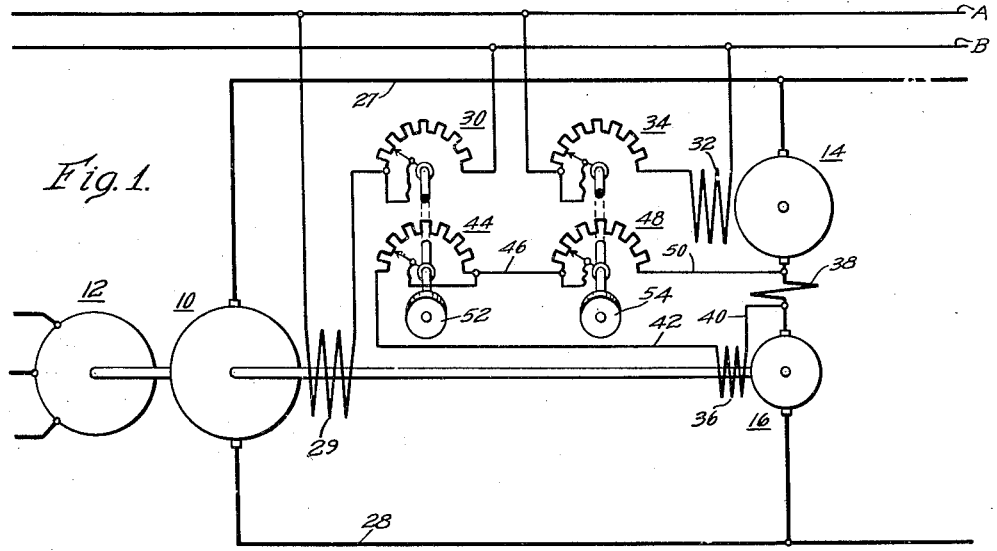

WITNESSES:

INVENTOR
Willard G. Cook.
BY
ATTORNEY

June 17, 1941.  W. G. COOK  2,246,294
CONTROL SYSTEM
Filed April 25, 1939  4 Sheets-Sheet 2

WITNESSES:
C. J. Weller.
Joe Weber

INVENTOR
Willard G. Cook.
BY J. M. Crawford
ATTORNEY

June 17, 1941.  W. G. COOK  2,246,294
CONTROL SYSTEM
Filed April 25, 1939  4 Sheets-Sheet 3

WITNESSES:

INVENTOR
Willard G. Cook.
BY
ATTORNEY

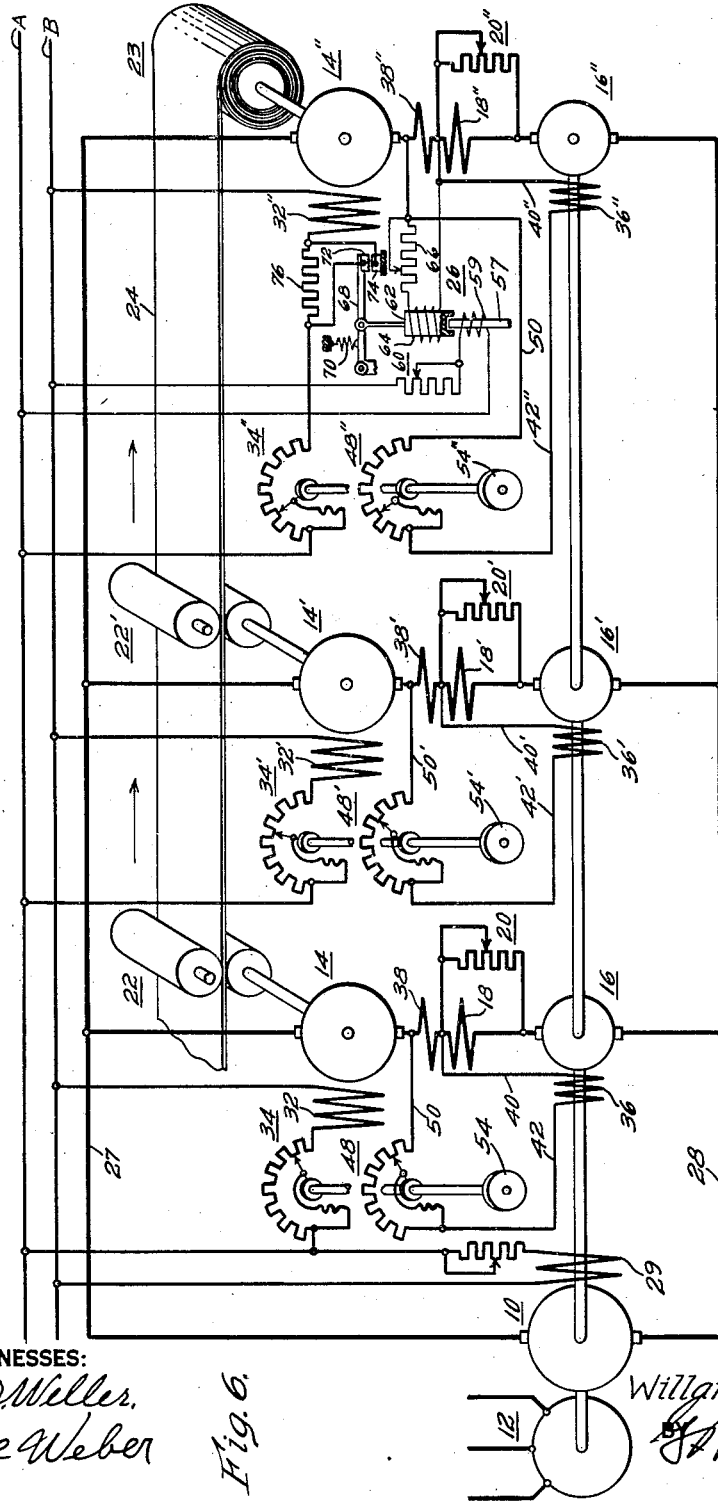

Patented June 17, 1941

2,246,294

UNITED STATES PATENT OFFICE 2,246,294

CONTROL SYSTEM

Willard G. Cook, Wilkinsburg, Pa., assignor to Westinghouse Electric & Manufacturing Company, East Pittsburgh, Pa., a corporation of Pennsylvania Application April 25, 1939, Serial No. 269,908

24 Claims. (Cl. 172—239)

My invention relates, generally, to control systems, and, more particularly, to systems for providing the desired speed regulation for direct current motors over a wide speed range.

In the production of sheet steel it is common practice to reduce the steel to the desired thickness by passing it, in the form of a strip, through a tandem mill comprising a plurality of reducing roll stands which simultaneously engage the strip and which perform a reducing operation on the strip. Each of the roll stands is driven by a separate direct current motor whose speed range is selectively established by the proper adjustment of its field excitation, and whose speed variation from standstill to normal running speed is controlled by varying the potential applied to its armature. The armatures of the drive motors are connected to a common bus which is energized by a variable voltage main generator or a plurality of such main generators.

In the operation of such tandem strip rolling mills a voltage is applied to the motors of such value as to produce a speed of approximately 10 percent of normal running speed by the proper excitation of the main generator or generators, while the leading end of the strip is being threaded through the mill. After the mill is threaded the main generator voltage is increased to simultaneously accelerate the motors to normal running speed. The motors are simultaneously decelerated from normal speed to threading speed by armature voltage control after a strip has passed through the mill and the mill is ready to receive another strip.

It has been found that considerable strip breakage due to excessive tensions on the strip occurs during the threading, accelerating, and decelerating periods of the mill operation. This breakage is due to the failure to maintain the desired speed relations between the roll motors and this failure is caused by wide variation of the speed regulation of the motors over the range of speeds from the threading speed to running speed.

A direct current motor having 1 percent or 2 percent speed regulation at the speed corresponding to the normal running speed of the mill may have from 20 percent to 40 percent speed regulation at the speed corresponding to the threading speed of the mill. This variation of speed regulation is due to the fact that the armature IR drop is substantially constant throughout the entire speed range for a given armature current. Thus a given IR drop will be a much greater percentage of the armature potential at the low armature potentials required for low speeds than at the higher armature potentials.

Another factor affecting the motor speed is the field weakening effect of the circulating current in the turns of the armature winding which are short-circuited by the brushes while undergoing commutation. This field weakening effect varies almost directly with the speed and load except at the lower speeds where it is almost negligible. The field weakening effect acts in an opposite manner to that of the armature IR drop upon the motor speed since field weakening tends to increase the motor speed while armature IR drop tends to decrease the motor speed.

Since the proper operation of a tandem strip mill requires that the speed regulation of the drive motors be substantially the same throughout the range of mill speeds from threading speed, an object of this invention is to provide a control system for the motors of a tandem strip rolling mill which shall function to so compensate for the motor speed influencing factors as to provide a substantially constant speed regulation for the motors throughout a desired speed range.

Another object of the invention is to provide control systems for direct current motors which shall function to maintain a substantially constant motor speed regulation or to produce any desired variable speed regulation throughout a predetermined speed range of the motors.

Figure 2:
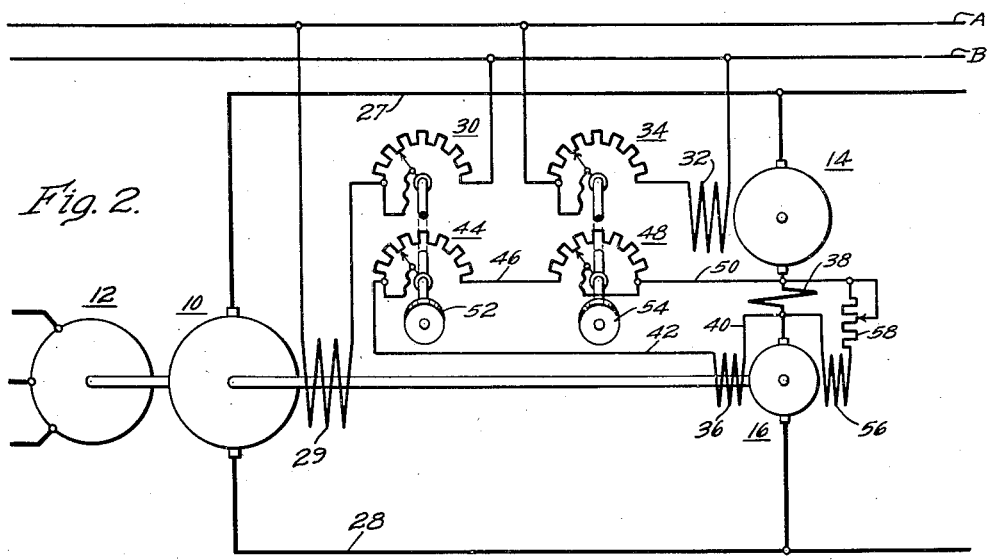
Figure 3:
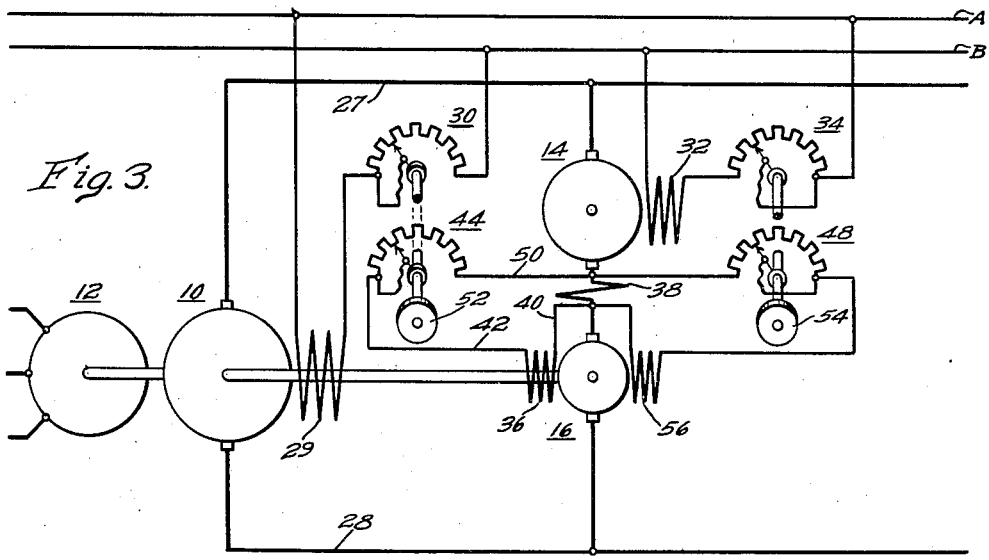
Figure 4:
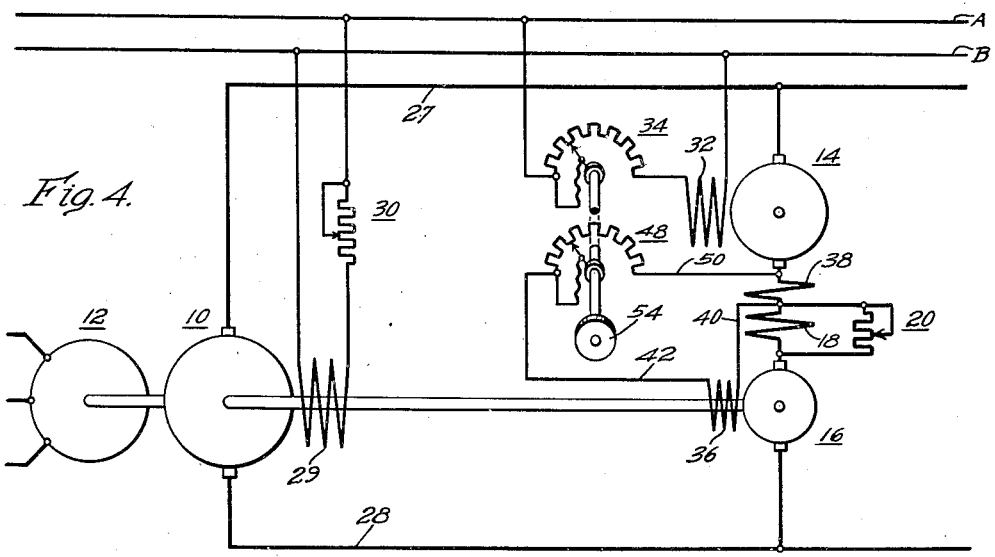
Figure 5:
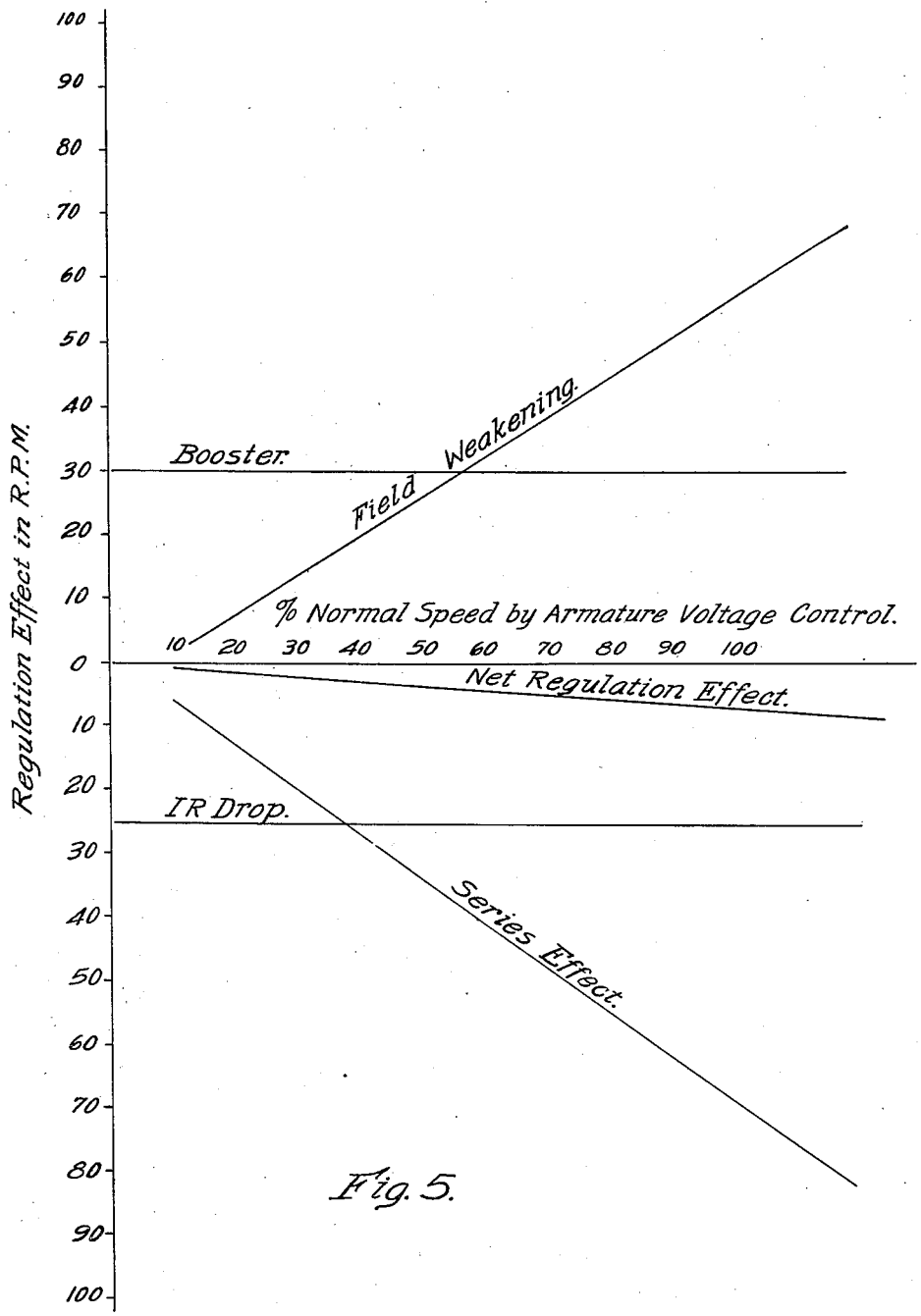

These and other objects and advantages of the invention will be apparent from the following detailed description taken in connection with the accompanying drawings in which like and similar reference characters designate corresponding and duplicate elements and in which, Figure 1 is a diagrammatic view of a control system for a drive motor embodying the principal features of one embodiment of my invention, Figs. 2, 3, and 4 are diagrammatic views of other embodiments of my invention, Fig. 5 is a graph illustrating the functioning of the embodiment of my invention shown in Fig. 4, and Fig. 6 is a diagrammatic view of a portion of a tandem strip rolling mill in which the embodiment of my invention shown in Fig. 4 is applied to each of two drive motors and a reel motor of the mill.

In the embodiment of the invention shown in Figure 1, a main generator 10 is continuously driven by any suitable motor or power translating device 12 and has its field winding connected for variable energization. A motor 14 has its armature connected for energization by the main generator 10 in series circuit relation with a continuously-driven booster generator 16 through conductors 27 and 28. The field winding of the booster generator is connected for energization in accordance with the armature current of the motor 14, the excitation of the motor 14 and the excitation of the main generator 10. The booster generator 16 may be continuously-driven by the drive motor 12, as shown, or in any other suitable manner.

The embodiment of the invention shown in Fig. 2 is generally the same as that of Fig. 1 except that two field windings are provided for the booster generator 16.

In the embodiment of the invention shown in Fig. 3 the two field windings of the booster generator 16 have separate rheostats, one for varying the energization of one field winding in accordance with the adjustment of the excitation of the motor 14, the other for varying the energization of the other field winding in accordance with the adjustment of the excitation of the main generator 10.

In the embodiment of the invention shown in Fig. 4, the excitation of the booster generator 16 is varied both in accordance with the excitation and the armature current of the motor 14. The motor 14 is provided with a series field winding 18 having an adjustable shunt 20.

The graph of Fig. 5 illustrates the regulation effects of the booster, the IR drop, the field weakening factor and the series field winding of the embodiment of the invention shown in Fig. 4.

In Fig. 6 the motors 14, 14' and 14'' drive the sets of rolls 22, and 22' and the reel 23, respectively, while the strip 24 passes through the tandem mill in the direction of the arrows. Each of the motors is controlled by the system of the embodiment of the invention of Fig. 4 and the reel motor has, in addition, a current regulator 26 which functions to maintain a substantially constant reel motor output and, therefore, a substantially constant winding tension on the strip.

Referring again to Fig. 1, the field winding 29 of the main generator 10 is connected to any suitable source of direct current power, indicated by the conductors A—B in series circuit relation with a rheostat 30. In a similar manner the main field winding 32 of the motor 14 is connected to the conductors A—B in series circuit relation with a rheostat 34.

The field winding 36 of the booster generator 16 is connected to be energized in accordance with the armature current of the motor 14. The circuit for the field winding 36 extends from one side of the series interpole winding 38 of the motor 14 through the conductor 40, the field winding 36, the conductor 42, a rheostat 44, the conductor 46, a rheostat 48, and the conductor 50 to the other side of the interpole winding 38. The rheostats 30 and 44 are mechanically interconnected, as shown, whereby they may be simultaneously actuated by the operating element 52. The electrical connections of the rheostats 30 and 44 are such as to increase the effective resistance of the rheostat 30 while decreasing the effective resistance of the rheostat 44. Similarly the rheostats 34 and 48 are mechanically interconnected to be simultaneously actuated by the operating element 54. The electrical connections of the rheostats 34 and 48 are such as to simultaneously increase or decrease the effective resistance of both of the rheostats.

In the operation of the embodiment of the invention shown in Fig. 1, the booster generator 16 will function to vary the energizing potential for the armature of the motor 14 in accordance with the armature current of the motor to thus compensate for the difference between the regulating effect of the IR drop in the motor armature and the regulating effect of the field weakening of the motor due to short-circuited armature turns during the period of commutation. The regulation effect of the IR drop in the armature will be to decrease the speed of the motor because of the decrease of effective armature potential. The regulating effect of the field weakening will be to increase the motor speed because of the decrease of the excitation of the motor 14.

The field weakening effect, due to the short-circuited turns of armature winding undergoing commutation, will be proportional to the speed of the motor 14. For a given load, therefore, it will be necessary to decrease the booster potential as the armature energizing potential, provided by the main generator 10, is increased. The output potential of the main generator 10 is increased by actuating the rheostat 30 and simultaneously the rheostat 44 is actuated, as hereinbefore described, to increase the effective resistance of the circuit of the field winding 36 of the booster 16. Thus, as the actuating potential for the armature of the motor 14 is increased, resulting in increased speed of the motor 14, the potential of the booster 16 is decreased to compensate for the increased field weakening effect at the higher motor speed.

The speed range or the base speed of the motor 14 may be determined by the proper adjustment of the field rheostat 34. As the rheostat 34 is actuated to increase its effective resistance, the base speed of the motor 14 will be increased because of the decrease in the energization of the main field winding 32. Since the field weakening effect is proportional to the speed of the motor 14, the voltage of the booster generator 16 must be decreased with increase of the speed of motor 14 by field control. This is accomplished by simultaneous actuation, as hereinbefore described, of the rheostat 48 with the field control rheostat 34.

The embodiment of the invention of Fig. 2 functions in a slightly different manner to provide substantially the same result as the embodiment of the invention of Fig. 1. In the embodiment of the invention of Fig. 2, an additional field winding 56 is provided for the booster generator 16 and this field winding is connected through a rheostat 58 to be energized in accordance with the potential drop across the interpole winding 38 of the motor 14. Field windings 36 and 56 are connected to oppose each other so that the net excitation of the booster generator 16 will be the difference between the excitations provided by the windings 36 and 56. In this system the rheostats 30 and 44 are connected to simultaneously increase or decrease their respective effective resistances, while the rheostat 34 is connected to increase its effective resistance as the effective resistance of the rheostat 48 is decreased. Thus, when the armature energizing potential is increased by the decrease in the effective resistance of the rheostat 30, the energization of the field winding 36 of the booster 16 is increased to decrease the net excitation of the booster 16 and thus decrease the booster output potential. The increase in the speed of the motor 14 due to a decrease in the effective resistance of the rheostat 34 will be compensated for by decreasing the effective resistance of the rheostat 48 simultaneously with the increase of the effective resistance of the rheostat 34 to thus increase the energization of the winding 36 and produce a smaller booster generator output potential.

The embodiment of the invention of Fig. 3 operates substantially the same as that of Fig. 2 with the field windings 36 and 56 of the booster generator 16 opposing but with the rheostat 48 connected in circuit with the booster field winding 56. The rheostats 34 and 48 are connected to simultaneously increase or decrease their effective resistances, thus providing a decrease in the booster voltage with a decrease in the excitation of the motor 14 by the simultaneous actuation of the rheostats 34 and 48. The rheostats 30 and 44 are connected to simultaneously increase or decrease their effective resistance as explained in connection with the embodiment of the invention of Fig. 2.

In the embodiment of the invention shown in Fig. 4, the motor 14 is provided with a cumulative series field 18 and its regulation effect is so adjusted by the shunting rheostat 20 as to produce a net regulation effect opposite to and almost neutralizing the field weakening regulation effect. The field weakening regulation effect is very small at low motor speeds and varies to increase the motor speed almost as a straight line function of the motor speed. The series field regulation effect is also small at the lower motor speeds and varies proportionally with the motor speed, but is larger proportionally than the field weakening effect at the lower motor speeds. It has been found that, by proper choice of the characteristics of the series field and the booster generator potential, the net regulating effect may be made any desired constant percentage of the motor speed throughout the speed range of the motor from approximately 10 percent normal speed to the maximum motor speed.

This balancing of regulating effects is illustrated by the graph of Fig. 5. Referring to Fig. 5, it will be seen that the IR drop remains substantially constant for a given load throughout the entire range of motor speeds by armature voltage control. Likewise the booster generator regulating effect which is opposite to the IR drop regulating effect remains substantially constant throughout the motor speed range. The field weakening regulating effect is very small at 10 percent normal speed range and increases with increased motor speed by armature voltage control. The series field regulation effect is much larger than the field weakening regulating effect at 10 percent normal speed and increases substantially as a straight line function of the motor speed by armature voltage control. The booster generator regulating effect is made larger than the IR drop regulating effect, an amount which will compensate for the difference in regulating effects of the series field and field weakening. The net regulation effect is indicated, and it will be seen that this regulation effect is a constant percentage throughout the entire range of motor speed by armature voltage control. The curves have been plotted in terms of the regulation effect of the various factors in R. P. M. for the various motor speeds throughout the entire range of motor speeds. Thus at 10 percent of the normal motor speed, the net regulating effect is approximately .7 R. P. M. and at 100 percent normal motor speed, the net regulating effect is substantially 7 R. P. M. Transposing these figures into terms of percentage R. P. M. of a mill motor whose motor speed is substantially 700 R. P. M., it will be seen that substantially 1 percent regulation is maintained throughout the speed range of the motor from 10 to 100 percent.

In the embodiment of the invention of Fig. 4 the rheostats 34 and 48 are simultaneously actuated by the control element 54 and are so connected electrically as to simultaneously increase or decrease their effective resistances, thus providing for a decrease in booster voltage with an increase in speed of the motor 14.

In Fig. 6 the control system of Fig. 4 is shown as applied to each of the roll drive motors 14 and 14' of a tandem strip rolling mill and to the reel motor 14'', and each operates on its associated motor in the manner described in connection with the explanation of the operation of the system of Fig. 4. In addition to the regulation control system the reel motor 14'' has associated with it a current regulator 26 which functions to maintain a substantially constant load on the motor 14'' to thus maintain a substantially constant tension on the strip as it is wound on the reel 23.

The regulator 26 comprises a fixed armature member 57 having a winding 59 associated therewith. The winding 59 is connected to be energized from the conductors A—B through a rheostat 60 by which its energization may be adjusted. A movable armature 62 is mounted to coact with the fixed armature 57 and has associated with it a winding 64 which is energized in accordance with the armature current of the motor 14'' by connecting it in series with a rheostat 66 across the interpole winding 38'' of the motor 14''. The movable armature 62 actuates the arm 68 against the bias of a spring element 70 to actuate the movable contact element 72 into engagement with the fixed contact element 74. The contact elements 72 and 74 are connected to complete a shunting circuit for a resistance element 76 which is connected in series circuit relation with the main field winding 32'' of the motor.

In the operation of the regulator 26 a predetermined armature current will cause the regulator to move the contact element 72 into engagement with the contact element 74 to complete the shunting circuit for the resistance element 76, thus increasing the excitation of the motor 14'' and, consequently, tending to decrease its speed and the torque which it applies to the reel 23. This will decrease the tension applied to the strip 24. The increase of the excitation of the motor 14'' will decrease its armature current, permitting the contact elements 72 and 74 to disengage, decreasing the excitation of the motor 14'' and thus tending to increase its speed. This intermittent engagement of the contact elements 72 and 74 will continue, the length of the intervals of engagement of the contact elements 72 and 74 being controlled by the armature current of the motor 14'', thus responding to the armature current of the motor 14'' to limit this armature current, thus limiting the motor output and the tension on the strip 24.

It is to be understood that the rheostats 30, 34, 44, 48, 34', 34'', 48', and 48'' need not have equal variations of effective resistance for each unit of actuation of the rheostat, but that the rheostats may have their resistances so graduated as to produce the relative resistance variations necessary to produce the desired adjustment in their associated circuits.

The embodiments of my control system disclosed herein have been described as functioning to maintain a substantially constant percentage speed regulation throughout the speed range of the motors. It is to be understood that if it is so desired, the regulation may be made to vary in any desired manner throughout the speed range of the motors by the proper adjustment of the relative values of the corresponding steps of the rheostats 30 and 44 in the embodiments shown in Figs. 1, 2, and 3 and the series field shunting rheostat 20 of the embodiments in their associated circuits.

Thus it will be seen that I have provided a control system for the drive motors of a tandem strip rolling mill which will function to so compensate and regulate the speed regulating effects of armature IR drop and field weakening as to maintain a substantially constant motor speed regulation through a predetermined speed range of the motors.

It is to be understood that the systems of control herein shown and described may be also applied in any instance where it is desired to maintain desired speed relations between a plurality of driving motors for work devices of any kind or they may be applied to any single driving motor.

In compliance with the requirements of the patent statutes, I have shown and described herein the preferred embodiments of my invention. It is to be understood, however, that the invention is not limited to the precise constructions shown and described but is capable of modification by one skilled in the art, the embodiments herein shown being merely illustrative of the principles of my invention.

I claim as my invention:

1. In a control system, a motor having means for varying its excitation, means providing an energizing potential for said motor armature, control means operative to vary the value of said energizing potential to thus vary the speed of the motor, a continuously-driven generator having its armature connected to affect the energization of said motor, means for exciting said generator in accordance with the armature current of said motor, means for substantially simultaneously varying the excitation of said generator and said motor armature energizing potential, and means for simultaneously varying the excitation of said motor and the excitation of said generator.

2. In a control system, a motor having a field winding, a first rheostat connected to control the energization of said motor field winding, a main generator connected to energize the armature of said motor, an auxiliary generator connected in series circuit relation with the armature of said motor, a field winding for said auxiliary generator connected to be energized in accordance with the motor armature current, a second rheostate connected in circuit with said auxiliary generator field winding, means for simultaneously actuating said first and second rheostats, a third rheostat connected in circuit with said auxiliary generator field winding, and means for simultaneously actuating said third rheostat and varying the output potential of said main generator.

3. In a control system, a motor having a field winding, a first rheostat connected to control the energization of said motor field winding, a main generator connected to energize the armature of said motor, an auxiliary generator connected in series circuit relation with the armature of said motor, a first field winding for said auxiliary generator connected to be energized in accordance with the motor armature current, means for selectively adjusting the energization of said first field winding, a second field winding for said auxiliary generator connected to be energized in accordance with the motor armature current, a second rheostat connected in circuit with said second auxiliary generator field winding, means for simultaneously actuating said first and second rheostats, a third rheostat connected in circuit with said second auxiliary generator field winding, and means for simultaneously actuating said third rheostat and varying the output potential of said main generator.

4. In a control system, a motor having a field winding, a first rheostat connected to control the energization of said motor field winding, a main generator connected to energize the armature of said motor, an auxiliary generator connected in series circuit relation with the armature of said motor, a first field winding for said auxiliary generator connected to be energized in accordance with the motor armature current, a second rheostat connected in circuit with said first field winding, means for simultaneously actuating said first and second rheostats, a second field winding for said auxiliary generator connected to be energized in accordance with the motor armature current, a third rheostat connected in circuit with said second field winding, and means for simultaneously actuating said third rheostat and varying the output potential of said main generator.

5. In a control system, a motor, a first rheostat for controlling the excitation of the motor, a main generator connected to energize the armature of said motor, an auxiliary generator connected in series circuit relation with the armature of said motor, a field winding for said auxiliary generator connected to be energized in accordance with the motor armature current, a second rheostat connected in circuit with said field winding, means for simultaneously actuating said first and second rheostats, and a cumulative series field for said motor, the relative values of speed regulation effect of said auxiliary generator potential, the series field excitation, the loss of motor armature potential due to armature resistance, and the motor field weakening due to short-circuited armature coils undergoing commutation, being such as to produce substantially the same motor regulation regardless of the motor speed.

6. In a control system for an armature type motor whose armature is connected to be energized from a source of power, a generator connected in series circuit relation with the armature of the motor, means for varying the output potential of said generator in accordance with the variations of the motor armature current, and means for substantially simultaneously varying the excitation of the motor and the output potential of said generator.

7. In a control system for an armature type motor whose armature is connected to be energized from a source of power, a generator connected in series circuit relation with the armature of the motor, means for varying the excitation of the generator in accordance with the variations of the motor armature current, and means for substantially simultaneously varying the excitations of the motor and the generator.

8. In a control system for a plurality of associated armature type motors whose armatures are connected to a common source of power, a generator other than the source of power connected in series circuit relation with the armature of each of the motors, and means associated with each of the motors and its associated generator for substantially simultaneously adjustably varying the excitation of the motor and the output potential of its associated generator.

9. In a control system for a plurality of armature type motors whose armatures are connected to a common source of power, a generator other than the source of power connected in series circuit relation with the armature of each of the motors, and means associated with each of the motors and its associated generator for substantially simultaneously adjustably varying the excitations of the motor and its associated generator.

10. In a control system for a plurality of associated armature type motors whose armatures are connected to a common source of power, a generator connected in series circuit relation with the armature of each of the motors, means for varying the output potential of each of said generators in accordance with the variations of the armature current of its associated motor, and means associated with each of the motors and its associated generator for substantially simultaneously varying the excitation of the motor and the output potential of its associated generator.

11. In a control system for a plurality of associated armature type motors whose armatures are connected to a common source of power, a generator connected in series circuit relation with the armature of each of the motors, means for varying the excitation of each of said generators in accordance with the variations of the armature current of its associated motor, and means associated with each of the motors and its associated generator for substantially simultaneously varying the excitations of the motor and its associated generator.

12. In a control system for an armature type motor whose armature is connected to be energized from a source of power, a series field winding for the motor connected to oppose the field weakening regulation effect, a generator other than the source of power connected in series circuit relation with the armature of the motor, and means for substantially simultaneously varying the excitation of the motor and the output potential of the generator.

13. In a control system for an armature type motor whose armature is connected to be energized from a source of power, a series field winding for the motor connected to oppose the field weakening regulation effect, a generator connected in series circuit relation with the armature of the motor, means for varying the output potential of said generator in accordance with the variations of the motor armature current, and means for substantially simultaneously varying the excitation of the motor and the output potential of said generator.

14. In a control system for a plurality of associated armature type motors whose armatures are connected to a common source of power, a series field winding for each of the motors connected to oppose the field weakening regulation effect, a generator connected in series circuit relation with the armature of each of the motors, and means associated with each of the motors and its associated generator for substantially simultaneously varying the excitation of the motor and the output potential of its associated generator.

15. In a control system for a plurality of associated armature type motors whose armatures are connected to a common source of power, a series field winding for each of the motors connected to oppose the field weakening regulation effect, a generator connected in series circuit relation with the armature of each of the motors, means for varying the output potential of each of said generators in accordance with the variations of the armature current of its associated motor, and means associated with each of the motors and its associated generator for substantially simultaneously varying the excitation of the motor and the output potential of its associated generator.

16. In a control system for a motor having its armature connected to an adjustable potential power source, a generator connected in series circuit relation with the armature of the motor, means for varying the output potential of the generator in accordance with the variations in the armature current of the motor, and means for substantially simultaneously varying the potential of the power source and the output potential of said generator.

17. In a control system, an adjustable potential power source, a motor having its armature connected to the adjustable potential power source, a generator other than the source of power connected in series circuit relation with the armature of the motor, means for substantially simultaneously varying the potential of the power source and the output potential of said generator, and means for substantially simultaneously varying the excitation of the motor and the output potential of said generator.

18. In a control system for a motor having its armature connected to an adjustable potential power source, a generator connected in series circuit relation with the armature of the motor, means for varying the output potential of the said generator in accordance with the variations in the armature current of the motor, means for substantially simultaneously varying the excitation of the motor and the output potential of said generator, and means for substantially simultaneously varying the potential of the power source and the output potential of said generator.

19. In a control system for a motor having its armature connected for energization from a source of power, a generator connected in series circuit relation with the armature of the motor, means for substantially simultaneously varying the excitation of the motor and the output potential of the generator, a series field winding for the motor, and means for selectively varying the effective series field excitation of the motor per unit of armature current.

20. In a control system for a motor having its armature connected for energization from a source of power, a series field winding for the motor, means for selectively varying the effective series field excitation of the motor per unit of armature current, a generator connected in series circuit relation with the armature of the motor, means for varying the output potential of the said generator in accordance with the variations in the armature current of the motor, and means for substantially simultaneously varying the excitation of the motor and the output potential of the said generator.

21. In a control system for a plurality of associated armature type motors whose armatures are connected to a common source of power, a series field winding for each of the motors, means for selectively varying the effective series field excitation of each of the motors per unit of armature current, a generator connected in series circuit relation with the armature of each of the motors, means for varying the output potential of each of said generators in accordance with the variations of the armature current of its associated motor, and means associated with each of the motors and its associated generator for substantially simultaneously varying the excitation of the motor and the output potential of its associated generator.

22. In a control system for a motor which is connected to be energized from an adjustable potential source of power, a generator connected in series circuit relation with the armature of the motor, two separate field windings for said generator, means for energizing each of said field windings in accordance with the amount of current in the armature of the motor, means for substantially simultaneously varying the excitation of the motor and the energization of one of said field windings, and means for substantially simultaneously varying the potential of the source of power and the energization of said one field winding.

23. In a control system for a plurality of motors connected to a common source of power and each of which drives a separate one of a plurality of work devices which are disposed to act upon a length of material as it is fed through the work devices, a series field winding for each of said motors, means for selectively varying the series excitation per unit of armature current for each of the motors, a generator connected in series circuit relation with the armature of each of the motors, means for controlling the excitation of each of said generators in accordance with the armature current of its associated motor, and means associated with each of the motors for substantially simultaneously varying the excitations of the motor and its associated generator.

24. In a control system for a motor whose armature is connected for energization from an adjustable potential source of power, a generator connected in series circuit relation with the armature of the motor, first and second field windings for said generator, means for energizing each of said field windings in accordance with the current in the armature of the motor, means for substantially simultaneously varying the excitation of the motor and the energization of one of said field windings, and means for substantially simultaneously varying the potential of the source of power and the energization of the other of said field windings.

WILLARD G. COOK.